US012669227B2

(12) United States Patent
Li et al.

(10) Patent No.: US 12,669,227 B2
(45) Date of Patent: Jun. 30, 2026

(54) LAMP INSTALLED BY QUICK PLUGGING AND IMPLEMENTATION METHOD THEREOF

(71) Applicant: Hengdian Group Tospo Lighting Co., Ltd., Jinhua (CN)

(72) Inventors: Tao Li, Jinhua (CN); Liang Chen, Jinhua (CN); Kaixuan Ge, Jinhua (CN); Linlin Cheng, Jinhua (CN); Hao Chen, Jinhua (CN); Jinghang Zhou, Jinhua (CN); Miao Han, Jinhua (CN); Wei Liu, Jinhua (CN)

(73) Assignee: HENGDIAN GROUP TOSPO LIGHTING CO., LTD., Jinhua City (CN)

( * ) Notice: Subject to any disclaimer, the term of this patent is extended or adjusted under 35 U.S.C. 154(b) by 0 days.

(21) Appl. No.: 19/031,479

(22) Filed: Jan. 18, 2025

(65) Prior Publication Data

US 2025/0314361 A1     Oct. 9, 2025

(30) Foreign Application Priority Data

Apr. 7, 2024    (CN) .......................... 202410408028.2

(51) Int. Cl.
F21S 8/02 (2006.01)
F21V 21/04 (2006.01)
(Continued)

(52) U.S. Cl.
CPC .............. F21S 8/02 (2013.01); F21V 21/046 (2013.01); F21V 23/06 (2013.01); H02G 3/081 (2013.01); H02G 3/14 (2013.01)

(58) Field of Classification Search
CPC .......... F21S 8/02; F21V 21/046; F21V 23/06; H02G 3/081; H02G 3/14
See application file for complete search history.

(56) References Cited

U.S. PATENT DOCUMENTS 6,146,191 A * 11/2000 Kerr, Jr. ................. H02G 3/123
                                                    439/537
11,296,469 B2 * 4/2022 Fleming .................. F21V 23/06
(Continued)

*Primary Examiner* — Christopher E Dunay
(74) *Attorney, Agent, or Firm* — The Dobrusin Law Firm, P.C.; Kristen L. Pursley

(57) ABSTRACT

A lamp installed by quick plugging is disclosed, including a junction box and a lamp body, where the lamp body includes a rear cover, and two symmetrically provided installation springs are connected to the rear cover; a drive plate is provided inside the rear cover; a connecting female end is connected to the drive plate, and the connecting female end is electrically connected to the drive plate; a light source plate is also provided inside the rear cover, and a face ring is connected below the rear cover; a connecting male end corresponding to the connecting female end is installed inside the junction box; a connecting elastic sheet is connected to an upper surface of the rear cover, and connecting flanges are provided inside the junction box. An implementation method of the lamp installed by quick plugging is also disclosed. The quick connection between the drive plate and a power input is realized by matching the pluggable connecting female end and connecting male end, and the connecting female end and the connecting male end are both located in the junction box after connection so that a circuit solution of the lamp may adopt a linear non-isolated circuit, thereby reducing the circuit cost and also meeting the requirements of safety regulations.

6 Claims, 13 Drawing Sheets

(51) Int. Cl.
    *F21V 23/06*        (2006.01)
    *H02G 3/08*        (2006.01)
    *H02G 3/14*        (2006.01)

(56)               References Cited

U.S. PATENT DOCUMENTS

| | | | |
|---|---|---|---|
| 11,435,064 B1 * | 9/2022 | Danesh | F21V 21/04 |
| 2012/0266449 A1 * | 10/2012 | Krupa | F21V 19/00 |
| | | | 29/592.1 |
| 2013/0095689 A1 * | 4/2013 | Hayman | H01R 13/622 |
| | | | 439/359 |
| 2015/0043201 A1 * | 2/2015 | Liu | F21S 8/02 |
| | | | 362/147 |
| 2022/0307659 A1 * | 9/2022 | Cohen | F21V 23/0464 |

* cited by examiner

LAMP INSTALLED BY QUICK PLUGGING AND IMPLEMENTATION METHOD THEREOF

CROSS-REFERENCES TO RELATED APPLICATIONS

This application claims the benefit of Chinese patent application No. 202410408028.2, filed on 7 Apr. 2024, entitled "LAMP INSTALLED BY QUICK PLUGGING AND IMPLEMENTATION METHOD THEREOF", the entire contents of which are incorporated by reference herein.

TECHNICAL FIELD

The present disclosure belongs to the technical field of split lamps, and particularly relates to a lamp installed by quick plugging and an implementation method thereof.

BACKGROUND

A split lamp allows the separation of its junction box and lamp body, so that wiring can be done simply by holding the junction box without holding the heavy lamp body. Therefore, the wiring fatigue of an installer may be reduced. After the wiring, the junction box is plugged into the lamp body, and the installation is very convenient. Thus, this kind of lamp on the market cannot be replaced.

However, the overall cost of split lamps on the market is relatively high, which is mainly due to the fact that the split lamps with pluggable DC male and female wires can only use the switch isolation circuit solution to avoid the requirements of safety regulations.

Therefore, there is an urgent need for a lamp installed by quick plugging to satisfy the installation convenience brought about by the split driving and enable a lower cost.

SUMMARY

An object of the present disclosure is to provide a lamp installed by quick plugging so as to solve the problems set forth in the above background. The lamp installed by quick plugging provided by the present disclosure has the features of satisfying the installation convenience brought about by the split driving and enabling a lower cost.

Another object of the present disclosure is to provide an implementation method of the lamp installed by quick plugging.

In order to achieve the above-mentioned object, the present disclosure provides the following technical solutions. A lamp installed by quick plugging is provided, including a junction box and a lamp body, where the lamp body includes a rear cover, and two symmetrically provided installation springs are connected to the rear cover; a drive plate is provided inside the rear cover; a connecting female end is connected to the drive plate, and the connecting female end is electrically connected to the drive plate; a light source plate is also provided inside the rear cover, and a face ring is connected below the rear cover; a connecting male end corresponding to the connecting female end is installed inside the junction box; a connecting elastic sheet is connected to an upper surface of the rear cover, and a connecting flange corresponding to the connecting elastic sheet are provided inside the junction box.

Further, in order to enable a light-emitting mode of the lamp body to be side light emitting, the light source plate is connected to an inner wall of the rear cover, and a reflective paper, a light guide plate, and a diffusion plate are successively provided from top to bottom inside the rear cover.

Further, in order to install the connecting male end, a male end bracket is connected inside the junction box and arranged with a male end installation groove, and an upper end of the connecting male end is embedded in the male end installation groove.

Further, in order to realize the limiting installation of the connecting male end, each of two side surfaces of the connecting male end is provided with a male end fixing buckles located above the male end bracket, and each of front and rear surfaces of the connecting male end is provided with a male end limiting rib located below the male end bracket.

Further, in order to install the connecting female end, the rear cover is arranged with a first female end installation groove, and the drive plate is arranged with a second female end installation groove corresponding to the first female end installation groove; an upper end of the connecting female end is embedded in the first female end installation groove and the second female end installation groove.

Further, in order to realize the limiting installation of the connecting female end, each of two side surfaces of the connecting female end is provided with a female end fixing buckle located above the rear cover, and each of front and rear surfaces of the connecting female end is provided with a female end limiting rib located below the drive plate.

Further, in order to realize the quick positioning of the drive plate, four positioning flanges are provided inside the rear cover, and the drive plate is arranged with positioning grooves corresponding to the positioning flanges.

Further, in order to reduce the production costs of the connecting male end and the connecting female end, the connecting flange is provided on a side wall of the junction box, and the connecting female end is electrically connected to the drive plate through a wire.

Further, in order to reduce the size of the junction box, thereby reducing the cost, the light source plate and the drive plate are an optical drive integrated plate, and a reflective cup is arranged below the optical drive integrated plate.

Further, in the present disclosure, an implementation method of the lamp installed by quick plugging is provided, including the steps of:

(1) embedding a connecting female end in a first female end installation groove and a second female end installation groove to realize the connection between a drive plate and a rear cover;

(2) installing a connecting male end on a male end bracket, and connecting the connecting male end to a power input line;

(3) aligning the connecting female end with the connecting male end for inserting; and (4) matching the connecting female end with the connecting male end to realize the connection between the drive plate and a power input, and matching a connecting elastic sheet with a connecting flange to realize the connection between a lamp body and a junction box.

Compared with the prior art, the beneficial effects of the present disclosure are as follows.

1. In the present disclosure, the quick connection between the drive plate and a power input is realized by matching the pluggable connecting female end and connecting male end, and the connecting female end and the connecting male end are both located in the junction box after connection so that a circuit solution of the lamp may adopt a linear non-isolated circuit, thereby reducing the circuit cost and also meeting the requirements of safety regulations.

2. In the present disclosure, the assembly connection between the drive plate and the rear cover is realized through the connecting female end, and there is no need to use screws to install the drive plate so that the assembly of the drive plate is more convenient, and the assembly cost is reduced.

3. In the present disclosure, four positioning flanges are provided inside the rear cover, and the drive plate is arranged with the positioning grooves corresponding to the positioning flanges, thereby realizing the quick positioning of the drive plate.

4. In the present disclosure, the connecting female end is electrically connected to the drive plate through a wire, and there is no need to install and fix the connecting male end and the connecting female end so that there is no requirement for appearance structures of the connecting male end and the connecting female end, thereby further reducing the costs.

5. In the present disclosure, the light source plate and the drive plate are the optical drive integrated plate, and the size of the junction box may be reduced using the form of the optical drive integrated plate, thereby further reducing the cost.

Figure 1:
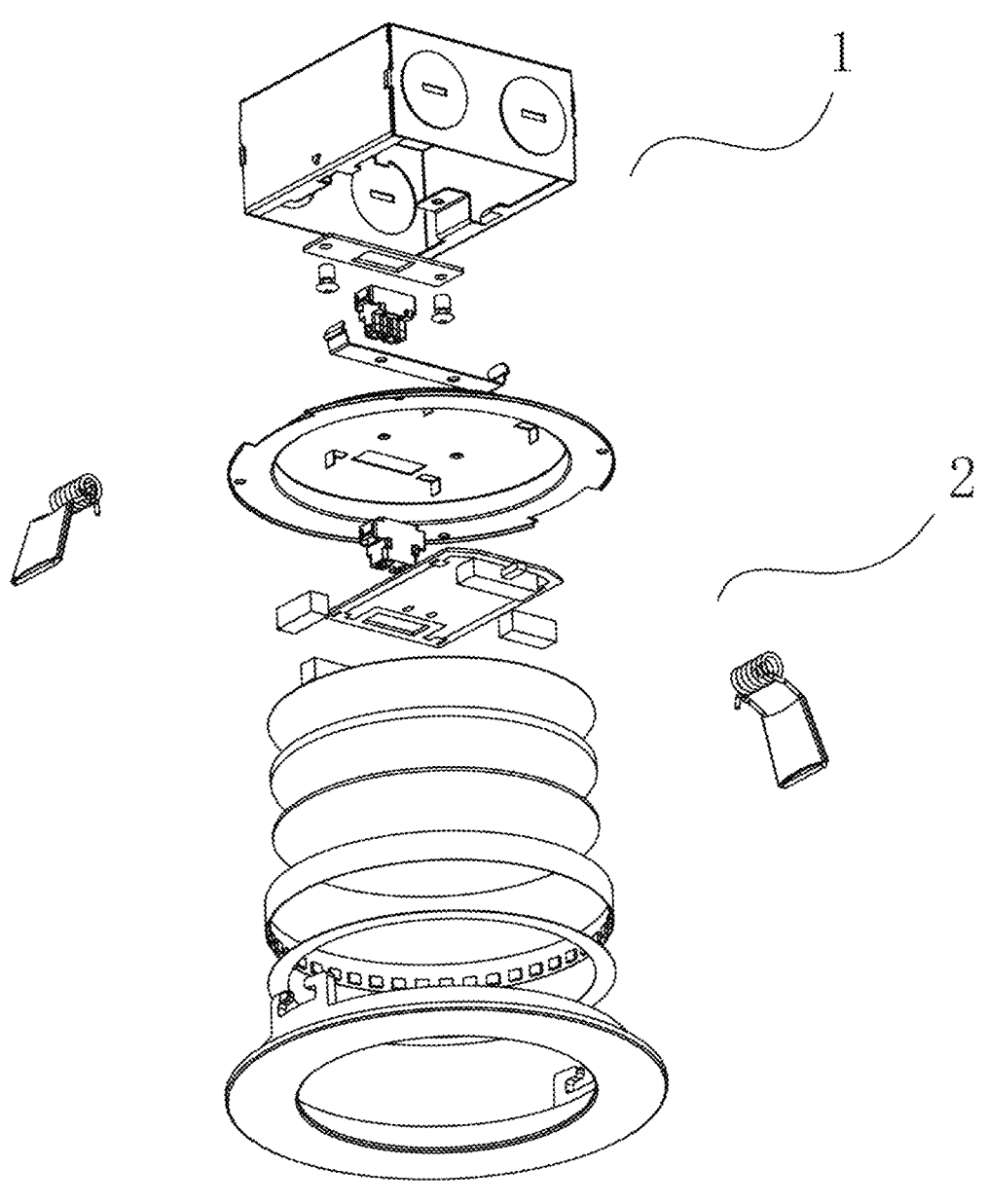
FIG. 1 is an exploded structural schematic diagram of the present disclosure.
Figure 2:
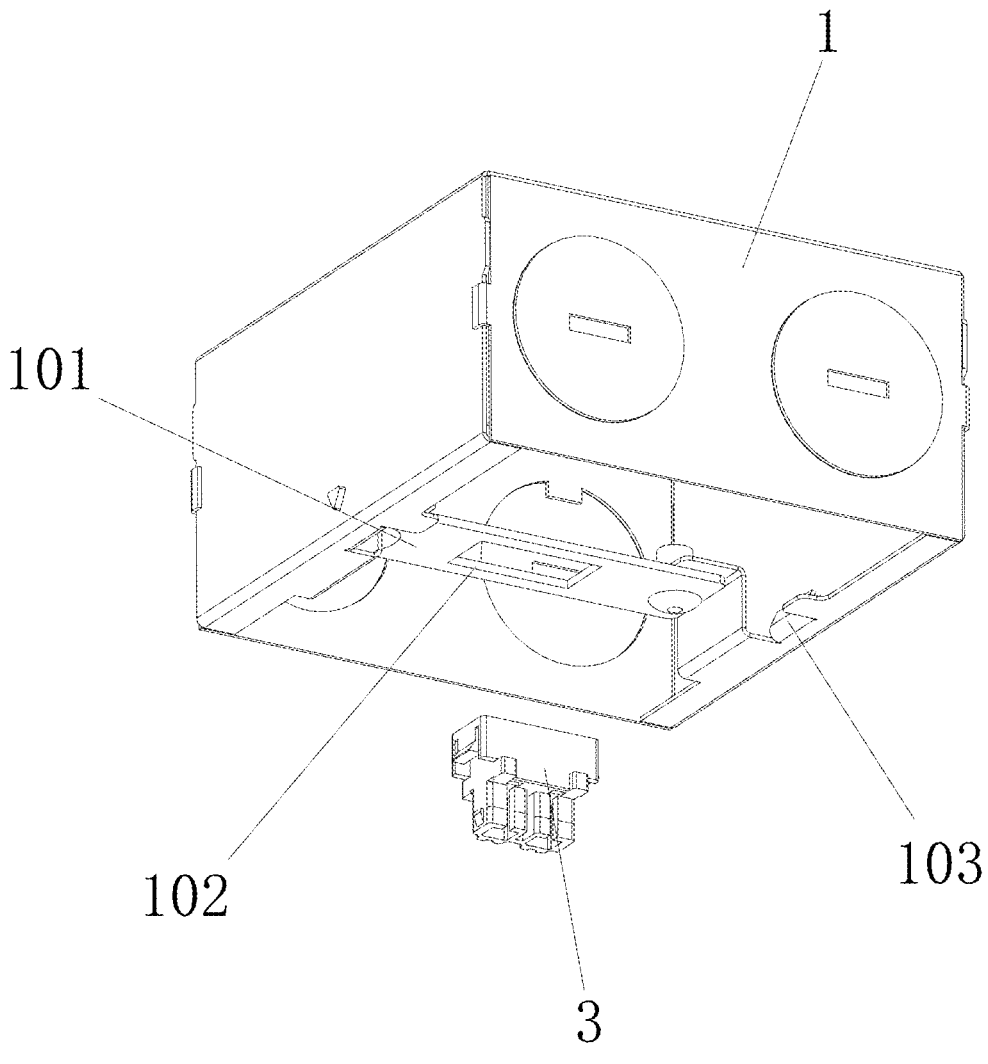
FIG. 2 is a schematic structural diagram of a junction box according to the present disclosure.
Figure 3:
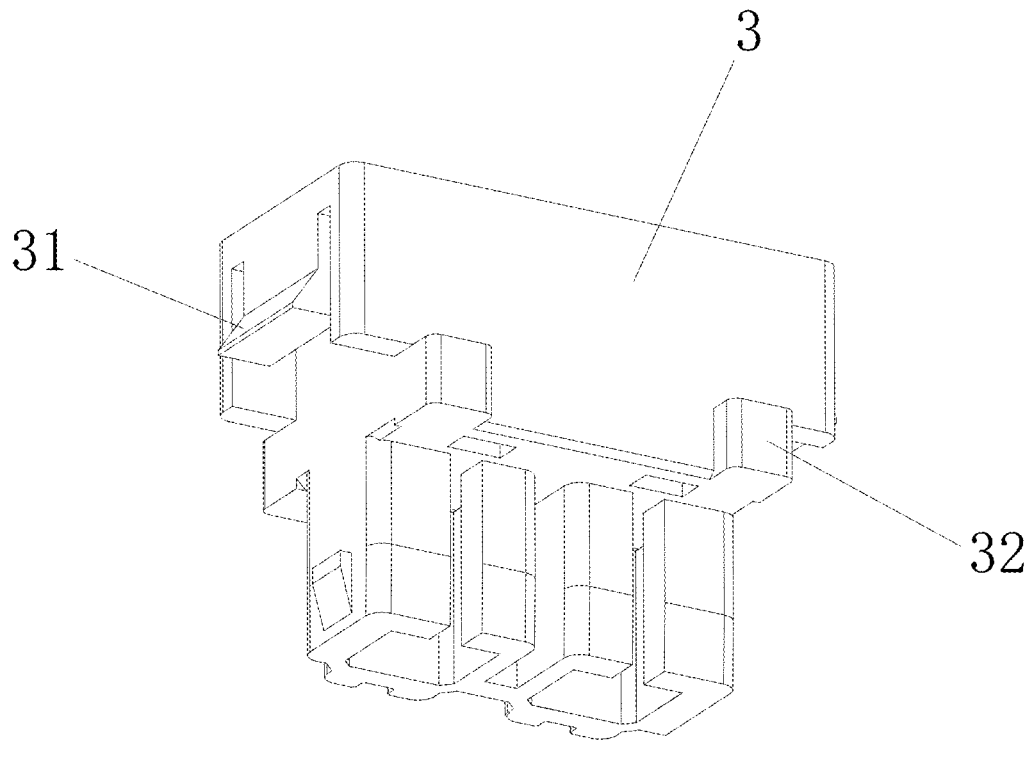
FIG. 3 is a schematic structural diagram of a connecting male end according to the present disclosure.
Figure 4:
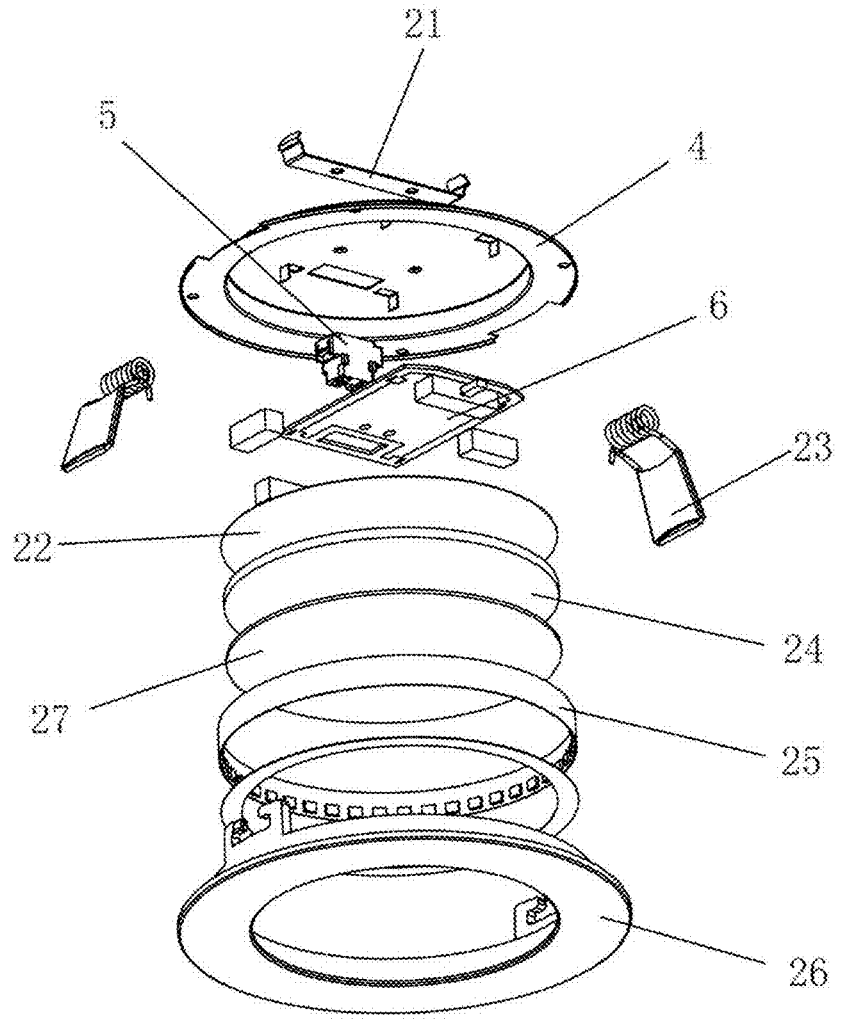
FIG. 4 is an exploded structural schematic diagram of a lamp body according to the present disclosure.
Figure 5:
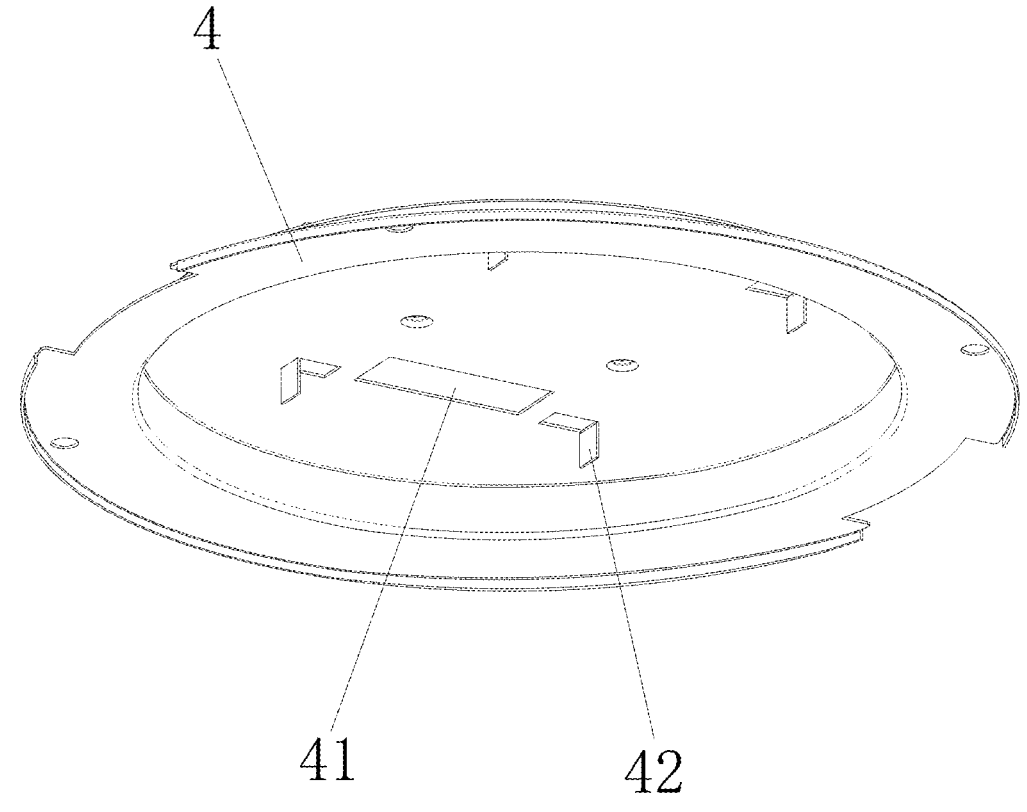
FIG. 5 is a schematic structural diagram of a rear cover according to the present disclosure.
Figure 6:
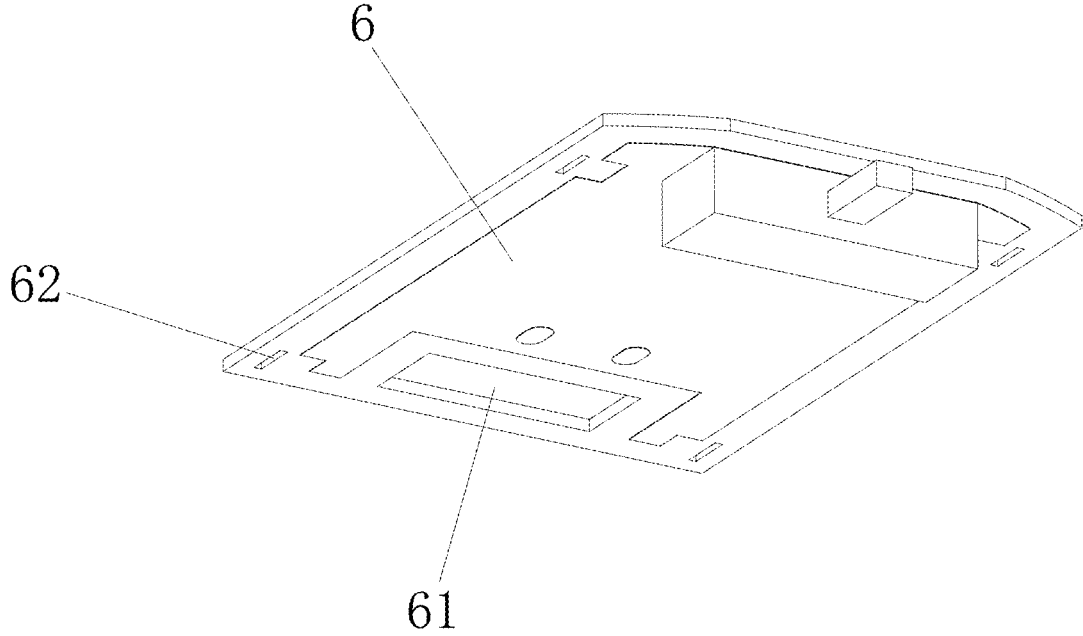
FIG. 6 is a schematic structural diagram of a drive plate according to the present disclosure.
Figure 7:
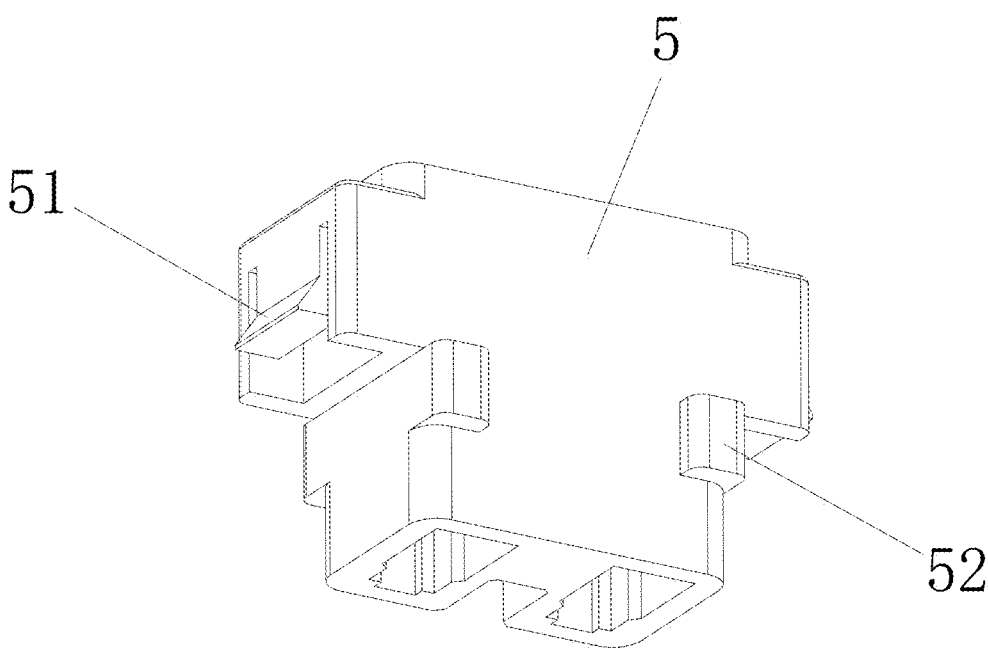
FIG. 7 is a schematic structural diagram of a connecting female end according to the present disclosure.
Figure 8:
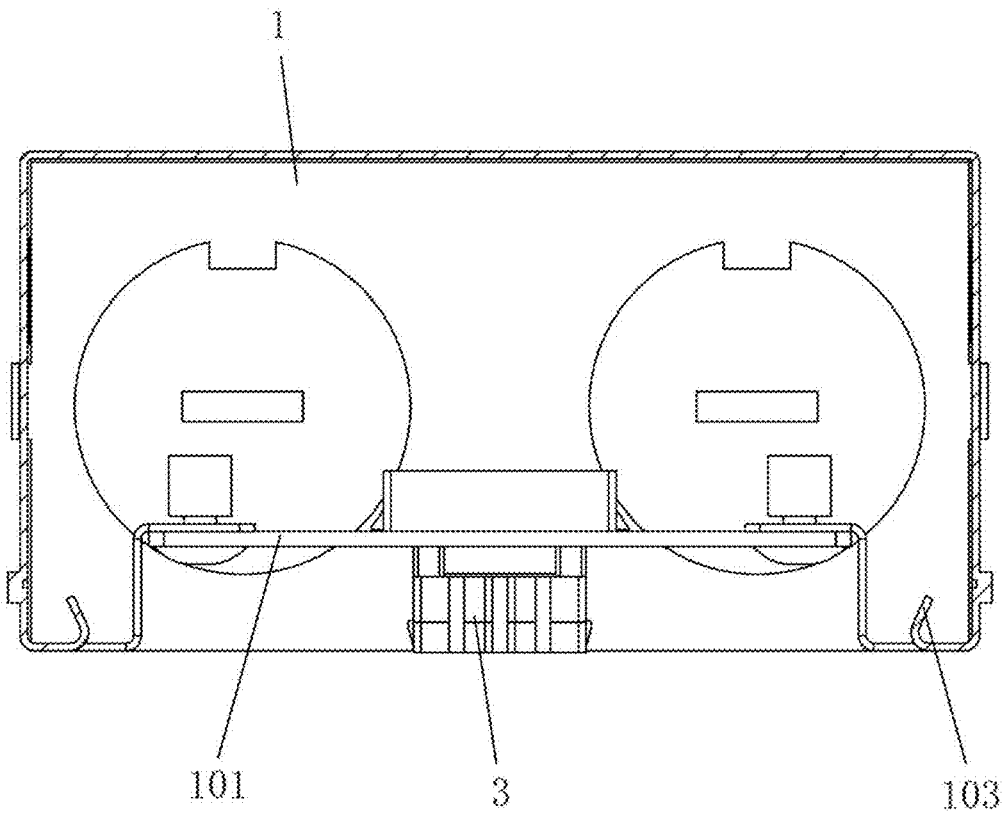
FIG. 8 is a schematic diagram of a cross-sectional structure of a junction box according to the present disclosure.
Figure 9:
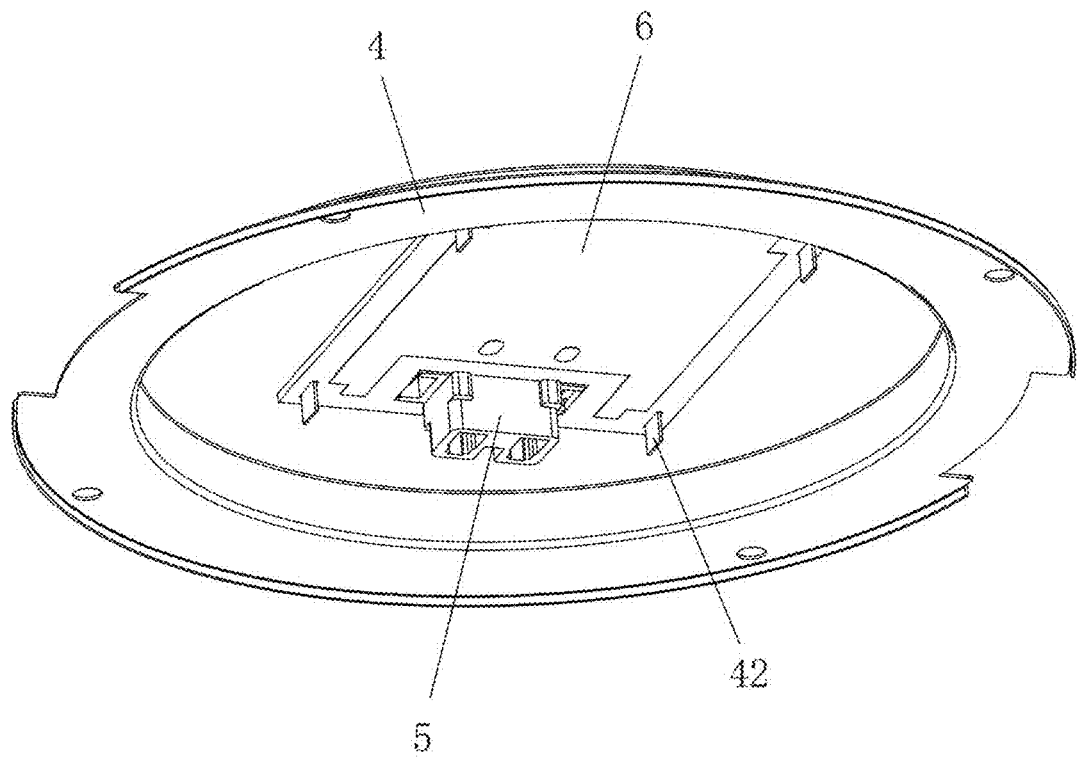
FIG. 9 is a schematic structural diagram showing the connection of a rear cover, a drive plate, and a connecting female end according to the present disclosure.
Figure 10:
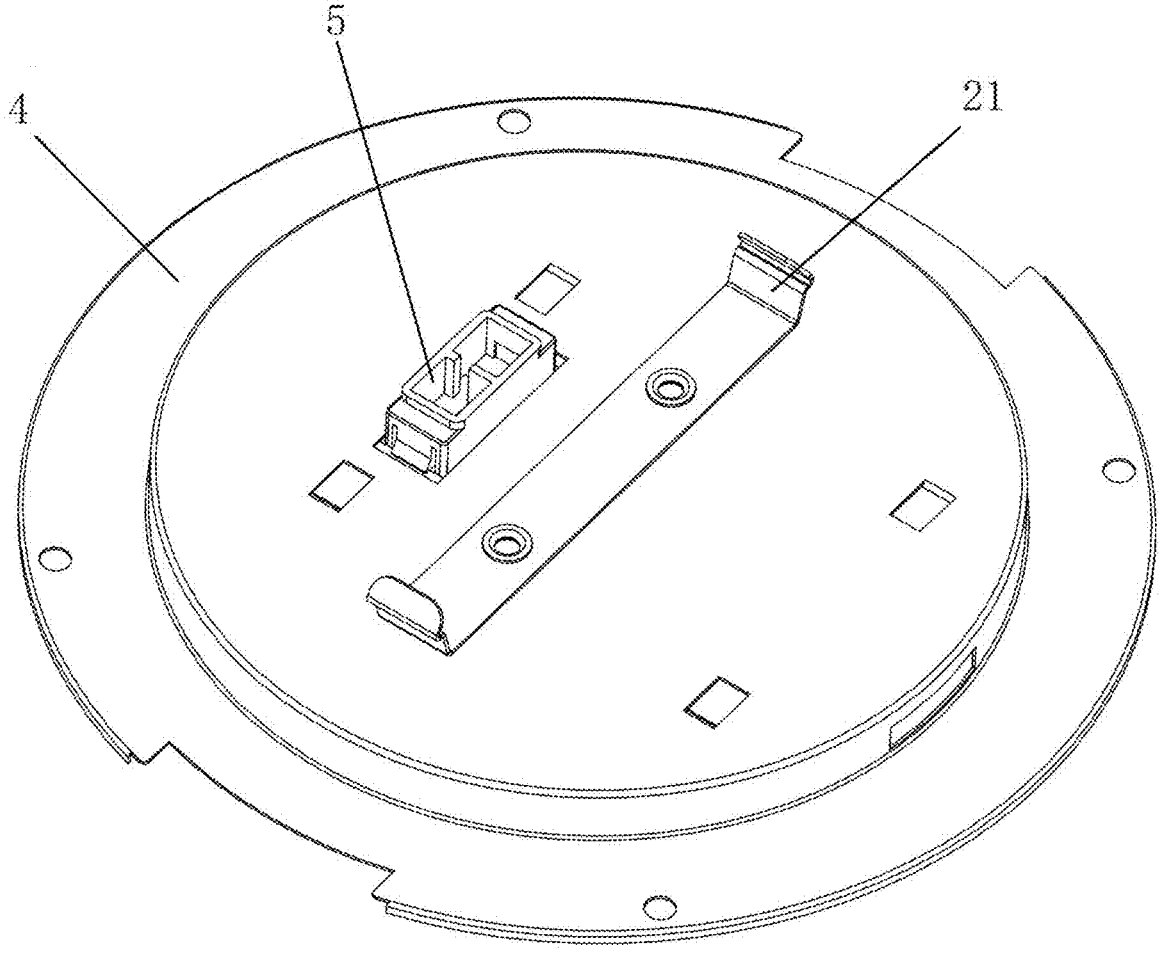
FIG. 10 is a schematic structural diagram showing the connection of a rear cover and a connecting female end according to the present disclosure.

In the drawings, 1—junction box; 101—male end bracket; 102—male end installation groove; 103—connecting flange; 104—bending edge; 2—lamp body; 21—connecting elastic sheet; 22—reflective paper; 23—installation spring; 24—light guide plate; 25—light source plate;

26—face ring; 27—diffusion plate; 3—connecting male end; 31—male end fixing buckle; 32—male end limiting rib; 4—rear cover; 41—first female end installation groove; 42—positioning flange; 43—limiting sleeve; 44—plug bush; 45—limiting buckle; 5—connecting female end; 51—female end fixing buckle; 52—female end limiting rib; 6—drive plate; 61—second female end installation groove; 62—positioning groove; 7—optical drive integrated plate; and 8—reflective cup.

DETAILED DESCRIPTION

The technical solutions in the embodiments of the present disclosure will be clearly and completely described below in conjunction with the accompanying drawings in the embodiments of the present disclosure. Obviously, the described embodiments are only some embodiments of the present disclosure, not all embodiments. Based on the embodiments of the present disclosure, all other embodiments obtained by a person skilled in the art without inventive effort fall within the scope of the present disclosure.

Embodiment 1

Referring to FIGS. 1-10, the present disclosure provides the following technical solutions. A lamp installed by quick plugging is provided, including a junction box 1 and a lamp body 2. The lamp body 2 includes a rear cover 4, and two symmetrically provided installation springs 23 are connected to the rear cover 4. A drive plate 6 is provided inside the rear cover 4. A connecting female end 5 is connected to the drive plate 6, and the connecting female end 5 is electrically connected to the drive plate 6. A light source plate 25 is also provided inside the rear cover 4, and a face ring 26 is connected below the rear cover 4. A connecting male end 3 corresponding to the connecting female end 5 is installed inside the junction box 1. A connecting elastic sheet 21 is connected to an upper surface of the rear cover 4, and connecting flanges 103 corresponding to the connecting elastic sheet 21 are provided inside the junction box 1.

In the present disclosure, by adopting the above-mentioned technical solution, the quick connection between the drive plate 6 and a power input is realized by matching the pluggable connecting female end 5 and connecting male end 3, and the connecting female end 5 and the connecting male end 3 are both located in the junction box 1 after connection so that a circuit solution of the lamp may adopt a linear non-isolated circuit, thereby reducing the circuit cost and also meeting the requirements of safety regulations.

Specifically, the light source plate 25 is connected to an inner wall of the rear cover 4, and a reflective paper 22, a light guide plate 24, and a diffusion plate 27 are successively provided from top to bottom inside the rear cover 4.

By adopting the above-mentioned technical solution, a light-emitting mode of the lamp body 2 is side light emitting.

Specifically, a male end bracket 101 is connected inside the junction box 1 and arranged with a male end installation groove 102, and an upper end of the connecting male end 3 is embedded in the male end installation groove 102.

By adopting the above-mentioned technical solution, the connecting male end 3 is installed.

Specifically, two side surfaces of the connecting male end 3 are provided with male end fixing buckles 31 located above the male end bracket 101, and front and rear surfaces of the connecting male end 3 are provided with male end limiting ribs 32 located below the male end bracket 101.

By adopting the above-mentioned technical solution, limiting installation of the connecting male end 3 is realized.

Specifically, the rear cover 4 is arranged with a first female end installation groove 41, and the drive plate 6 is arranged with a second female end installation groove 61 corresponding to the first female end installation groove 41. An upper end of the connecting female end 5 is embedded in the first female end installation groove 41 and the second female end installation groove 61.

By adopting the above-mentioned technical solution, the connecting female end 5 is installed. In addition, in the present disclosure, the assembly connection between the drive plate 6 and the rear cover 4 is realized through the connecting female end 5, and there is no need to use screws to install the drive plate 6 so that the assembly of the drive plate 6 is more convenient, and the assembly cost is reduced.

Specifically, two sides of the connecting female end 5 are provided with female end fixing buckles 51 located above the rear cover 4, and front and rear surfaces of the connecting female end 5 are provided with female end limiting ribs 52 located below the drive plate 6.

By adopting the above-mentioned technical solution, the limiting installation of the connecting female end 5 is realized.

Specifically, four positioning flanges 42 are provided inside the rear cover 4, and the drive plate 6 is arranged with positioning grooves 62 corresponding to the positioning flanges 42.

By adopting the above-mentioned technical solution, the quick positioning of the drive plate 6 is realized.

Embodiment 2

Figure 11:
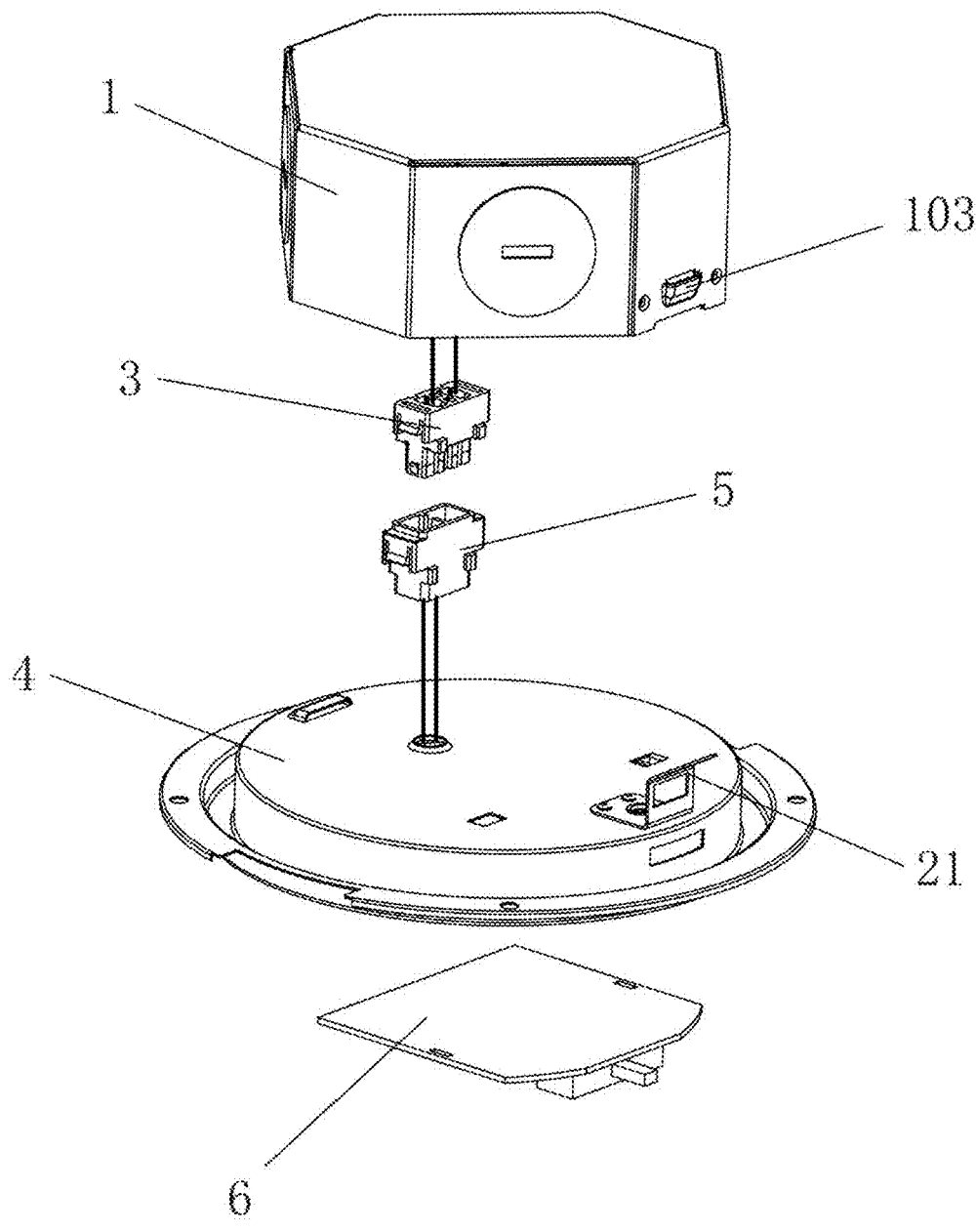
FIG. 11 is a schematic structural diagram of embodiment 2 according to the present disclosure.
Figure 12:
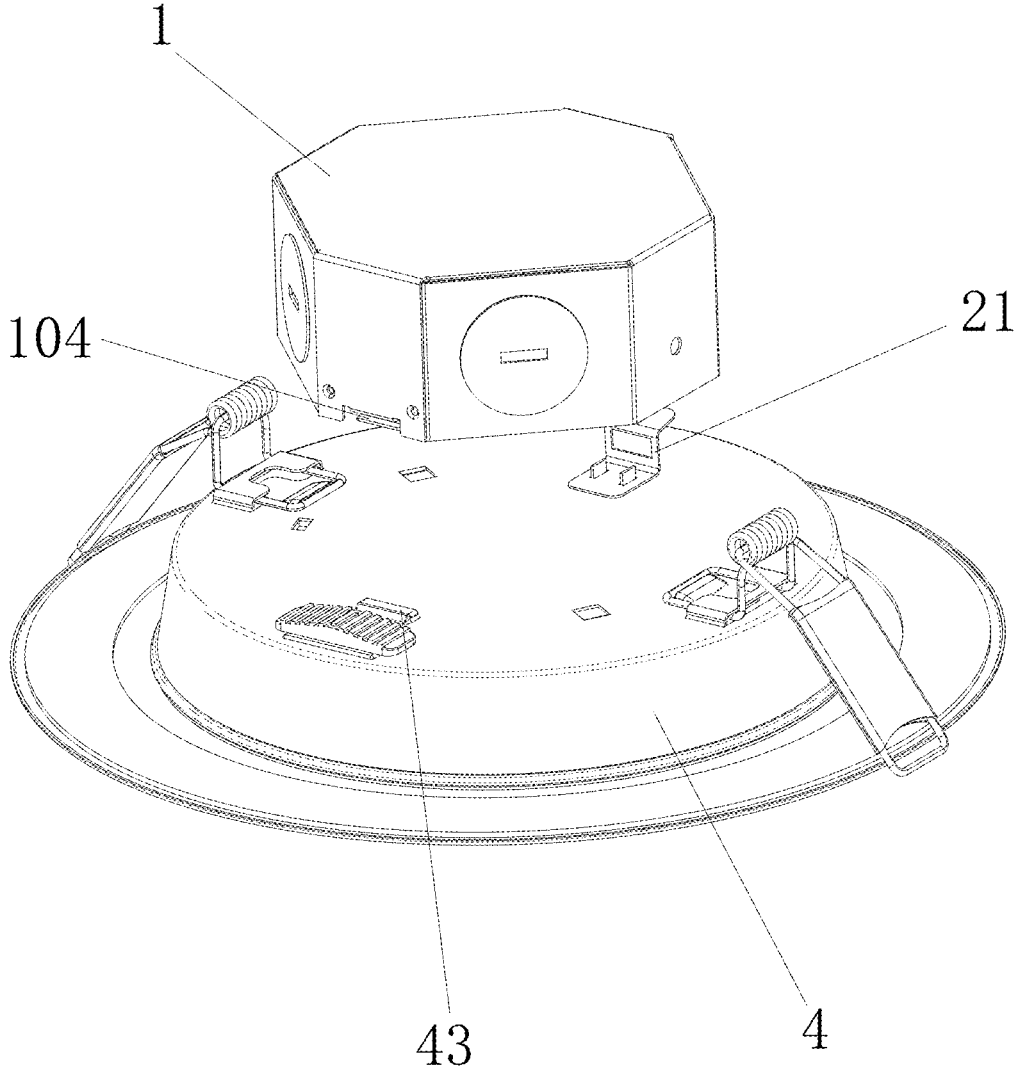
FIG. 12 is a schematic structural diagram showing the connection of a junction box and a rear cover of embodiment 2 according to the present disclosure.

Referring to FIGS. 11-12, this embodiment differs from embodiment 1 in that: specifically, a connecting flange 103 is provided on a side wall of a junction box 1, and a connecting female end 5 is electrically connected to a drive plate 6 through wires; a connecting elastic sheet 21 is fixed on a rear cover 4 at a position corresponding to the connecting flange 103 through a flange of the rear cover 4.

By adopting the above-mentioned technical solution, there is no need to install and fix the connecting male end 3 and the connecting female end 5 so that there is no requirement for appearance structures of the connecting male end 3 and the connecting female end 5, thereby further reducing the costs.

Specifically, an edge of the junction box 1 is provided with a bending edge 104 corresponding to the connecting flange 103, and the rear cover 4 is provided with a limiting sleeve 43 corresponding to the bending edge 104.

By adopting the above-mentioned technical solution, when a lamp body 2 and the junction box 1 are installed, the bending edge 104 is first inserted into the limiting sleeve 43, and then the connection is realized by matching the connecting elastic sheet 21 with the connecting flange 103.

Embodiment 3

Figure 13:
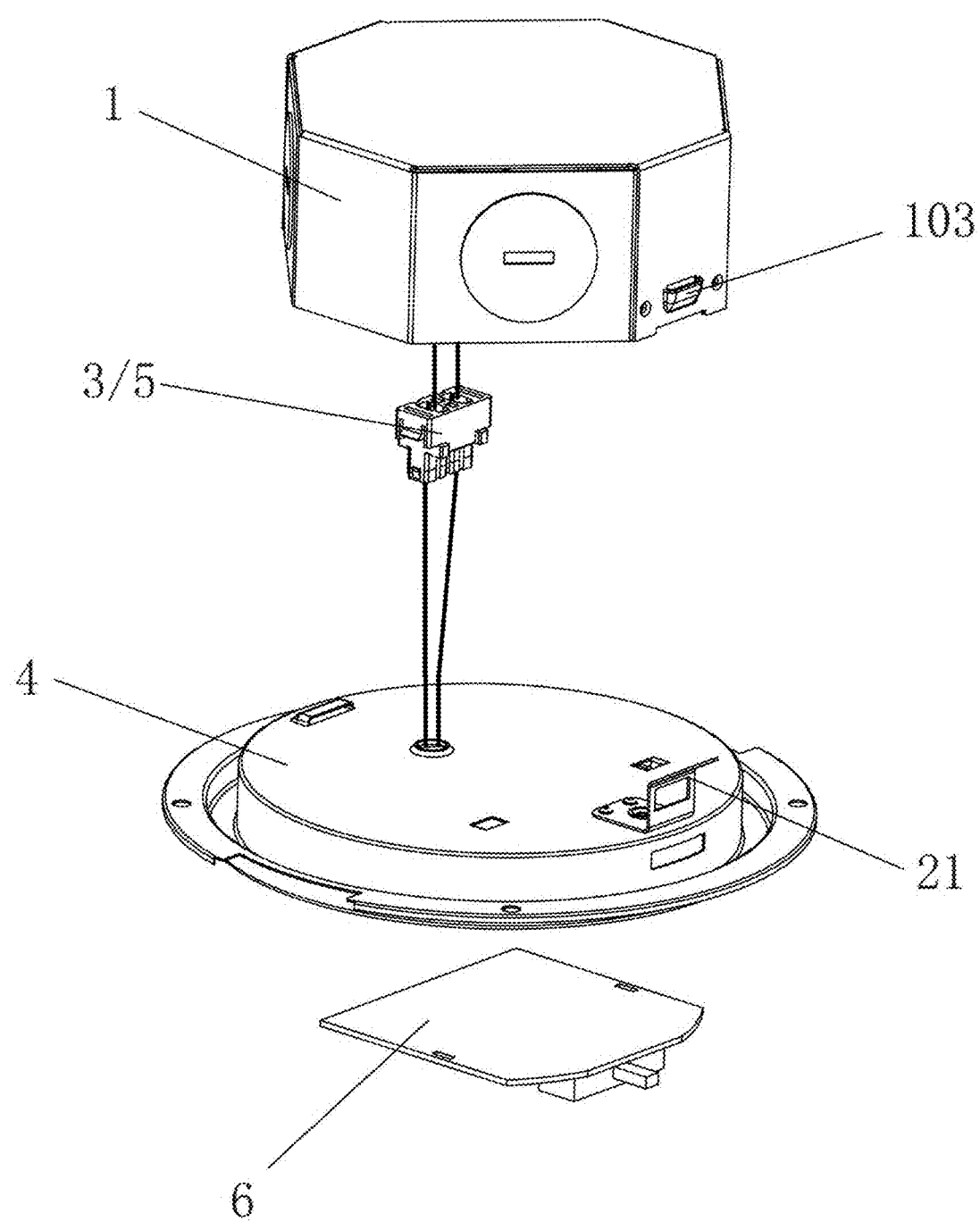
FIG. 13 is a schematic structural diagram of embodiment 3 according to the present disclosure.

Referring to FIG. 13, this embodiment differs from embodiment 2 in that: specifically, a drive plate 6 is connected with a power input only through a connecting male end 3, a connecting female end 5, or other types of wiring terminals.

Embodiment 4

Figure 14:
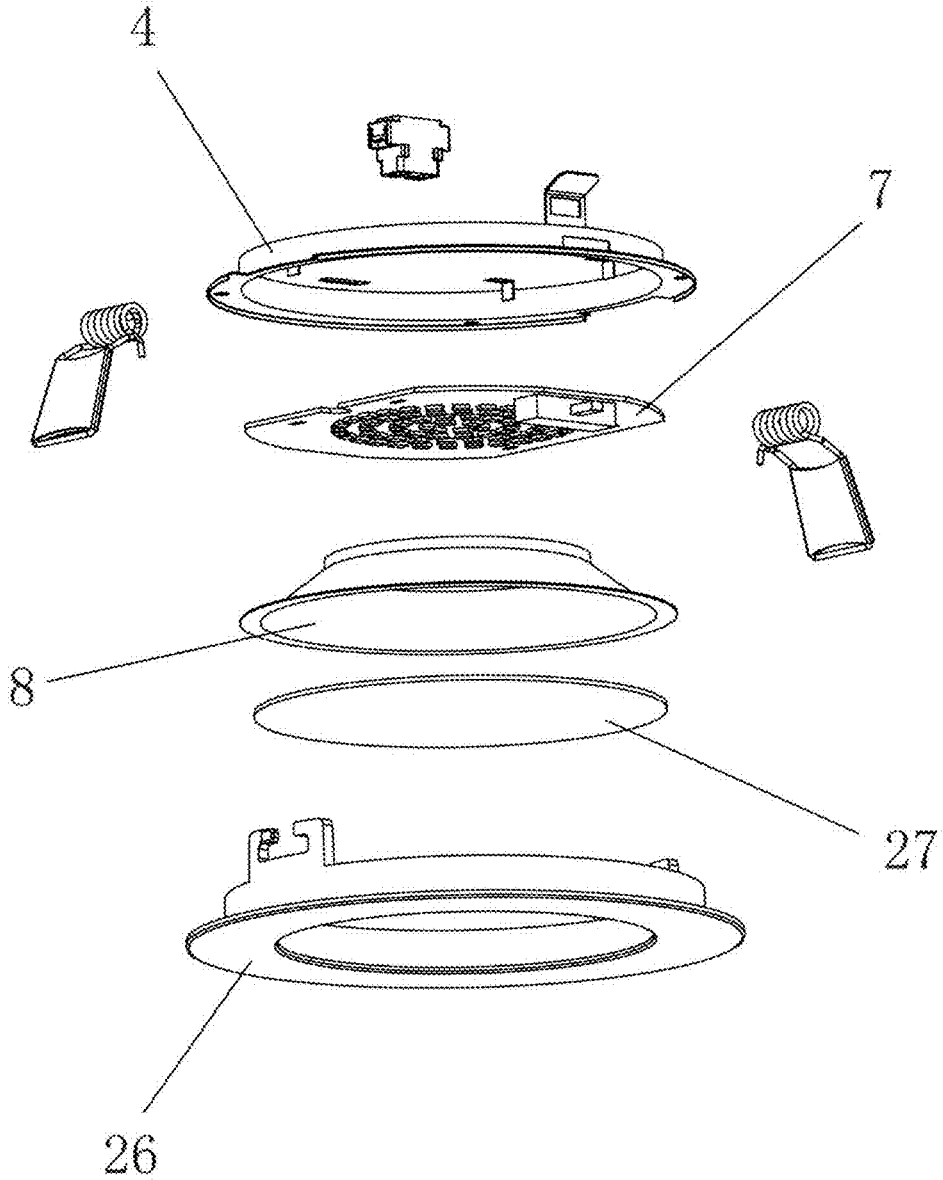
FIG. 14 is a schematic structural diagram of a lamp body of embodiment 4 according to the present disclosure.

Referring to FIG. 14, this embodiment differs from embodiment 1 in that: specifically, a light source plate 25 and a drive plate 6 are an optical drive integrated plate 7, and a reflective cup 8 is arranged below the optical drive integrated plate 7.

By adopting the above-mentioned technical solution, a light-emitting mode of a lamp body 2 is direct-type light emitting, and the size of a junction box 1 may be reduced using the form of the optical drive integrated plate 7, thereby further reducing the cost.

Embodiment 5

Figure 15:
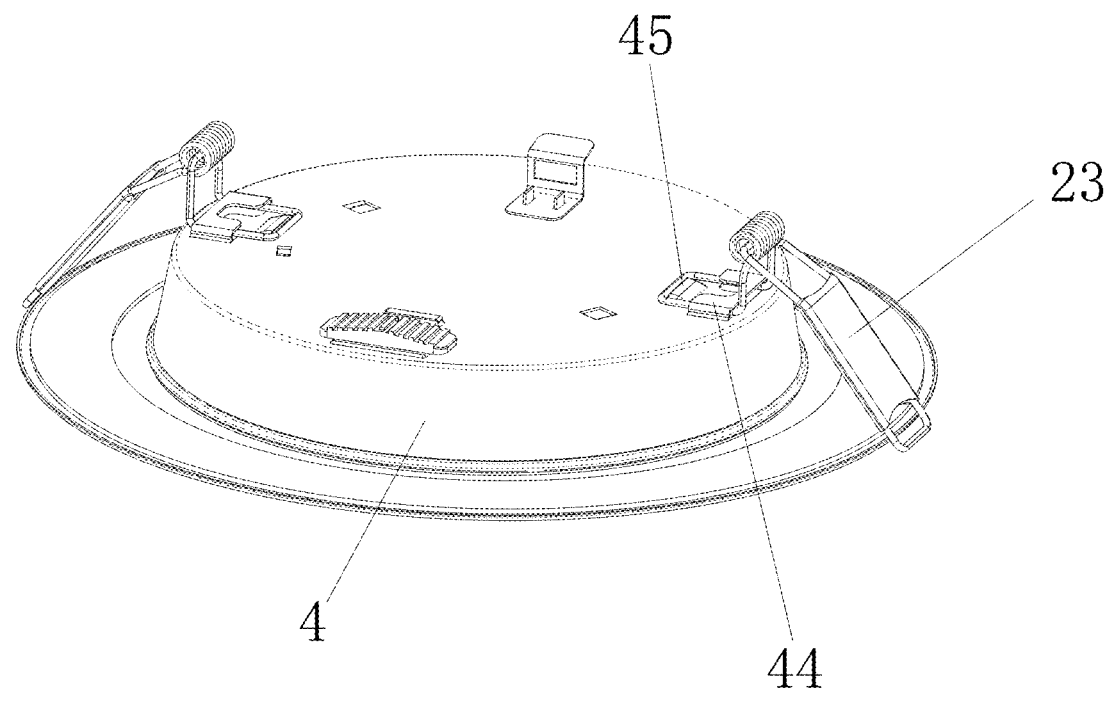
FIG. 15 is a schematic structural diagram showing the connection of installation springs and a rear cover of embodiment 5 according to the present disclosure.

Referring to FIG. 15, this embodiment differs from embodiment 1 in that: specifically, two symmetrically provided plug bushes 44 are provided on a back surface of a rear cover 4, and a limiting buckle 45 is provided on an inner side of the plug bush 44.

By adopting the above-mentioned technical solution, a middle part of an installation spring 23 is inserted into the plug bush 44 and limited by the limiting buckle 45, thereby realizing the installation of the installation spring 23.

Embodiment 6

Further, an implementation method of the lamp installed by quick plugging of the present disclosure includes the steps of:

(1) embedding a connecting female end 5 in a first female end installation groove 41 and a second female end installation groove 61 to realize the connection between a drive plate 6 and a rear cover 4;

(2) installing a connecting male end 3 on a male end bracket 101, and connecting the connecting male end 3 to a power input line;

(3) aligning the connecting female end 5 with the connecting male end for inserting, or connecting only using the connecting male end 3, the connecting female end 5, or other types of wiring terminals; and (4) matching the connecting female end 5 with the connecting male end 3 to realize the connection between the drive plate 6 and a power input, and matching a connecting elastic sheet 21 with connecting flanges 103 to realize the connection between a lamp body 2 and a junction box 1.

In summary, in the present disclosure, the quick connection between the drive plate 6 and a power input is realized by matching the pluggable connecting female end 5 and connecting male end 3, and the connecting female end 5 and the connecting male end 3 are both located in the junction box 1 after connection so that a circuit solution of the lamp may adopt a linear non-isolated circuit, thereby reducing the circuit cost and also meeting the requirements of safety regulations. The assembly connection between the drive plate 6 and the rear cover 4 is realized through the connecting female end 5, and there is no need to use screws to install the drive plate 6 so that the assembly of the drive plate 6 is more convenient, and the assembly cost is reduced. Four positioning flanges 42 are provided inside the rear cover 4, and the drive plate 6 is arranged with the positioning grooves 62 corresponding to the positioning flanges 42, thereby realizing the quick positioning of the drive plate 6. The connecting female end 5 is electrically connected to the drive plate 6 through wires, and there is no need to install and fix the connecting male end 3 and the connecting female end 5 so that there is no requirement for appearance structures of the connecting male end 3 and the connecting female end 5, thereby further reducing the costs. The light source plate 25 and the drive plate 6 are the optical drive integrated plate 7, and the size of the junction box 1 may be reduced using the form of the optical drive integrated plate 7, thereby further reducing the cost.

While embodiments of the present disclosure have been shown and described, it will be understood by a person skilled in the art that various changes, modifications, substitutions, and alterations may be made herein without departing from the principles and spirit of the present disclosure, and the scope of the present disclosure is defined by the appended claims and their equivalents.

The invention claimed is:

1. A lamp, comprising a junction box and a lamp body, wherein the lamp body comprises a rear cover, and two symmetrically provided installation springs are connected to the rear cover; a drive plate is located inside the rear cover;

wherein a connecting female end is connected to the drive plate, and the connecting female end is electrically connected to the drive plate;

wherein a light source plate is also located inside the rear cover, and a face ring is connected below the rear cover;

wherein a connecting male end corresponding to the connecting female end is installed inside the junction box;

wherein a connecting elastic sheet is connected to an upper surface of the rear cover, and a connecting flange corresponding to the connecting elastic sheet is located inside the junction box;

wherein a male end bracket is connected inside the junction box and arranged with a male end installation groove, and an upper end of the connecting male end is embedded in the male end installation groove;

wherein each of two side surfaces of the connecting male end is provided with a male end fixing buckle located above the male end bracket, and each of front and rear surfaces of the connecting male end is provided with a male end limiting rib located below the male end bracket;

wherein the rear cover is arranged with a first female end installation groove, and the drive plate is arranged with a second female end installation groove corresponding to the first female end installation groove; an upper end of the connecting female end is embedded in the first female end installation groove and the second female end installation groove; and wherein each of two side surfaces of the connecting female end is provided with a female end fixing buckle located above the rear cover, and each of front and rear surfaces of the connecting female end is provided with a female end limiting rib located below the drive plate.

2. The lamp according to claim 1, wherein the light source plate is connected to an inner wall of the rear cover, and a reflective paper, a light guide plate, and a diffusion plate are successively arranged from top to bottom inside the rear cover.

3. The lamp according to claim 1, wherein four positioning flanges are provided inside the rear cover, and the drive plate is arranged with positioning grooves corresponding to the four positioning flanges.

4. The lamp according to claim 1, wherein the connecting flange is provided on a side wall of the junction box, and the connecting female end is electrically connected to the drive plate through a wire.

5. The lamp according to claim 1, wherein the light source plate and the drive plate are an optical drive integrated plate, and a reflective cup is arranged below the optical drive integrated plate.

6. An implementation method of the lamp according to claim 1, comprising the steps of:

(1) embedding the connecting female end in the first female end installation groove and the second female end installation groove to realize a connection between the drive plate and the rear cover;

(2) installing the connecting male end on the male end bracket, and connecting the connecting male end to a power input line;

(3) aligning the connecting female end with the connecting male end for inserting; and (4) matching the connecting female end with the connecting male end to realize a connection between the drive plate and a power input, and matching a connecting elastic sheet with the connecting flange to realize a connection between the lamp body and the junction box.

* * * * *